(12) United States Patent
Yue et al.

(10) Patent No.: US 11,746,650 B2
(45) Date of Patent: Sep. 5, 2023

(54) METHOD FOR CALCULATING SINGLE-WELL CONTROLLED RESERVE OF LOW-PERMEABILITY/TIGHT GAS RESERVOIR AND ANALYZING RESIDUAL GAS THEREOF

(71) Applicant: Southwest Petroleum University, Sichuan (CN)

(72) Inventors: Ping Yue, Sichuan (CN); Guozhuang Wang, Sichuan (CN); Qingsong Gao, Sichuan (CN); Dongchen Liu, Sichuan (CN); Tao Lei, Sichuan (CN); Guanglei Ren, Sichuan (CN); Zhiwei Xie, Sichuan (CN)

(73) Assignee: Southwest Petroleum University, Chengdu (CN)

( * ) Notice: Subject to any disclaimer, the term of this patent is extended or adjusted under 35 U.S.C. 154(b) by 643 days.

(21) Appl. No.: 16/861,493

(22) Filed: Apr. 29, 2020

(65) Prior Publication Data
US 2021/0002999 A1 Jan. 7, 2021

(30) Foreign Application Priority Data
Jul. 2, 2019 (CN) .......................... 201910591594.0

(51) Int. Cl.
*E21B 49/00* (2006.01)
*E21B 47/06* (2012.01)

(52) U.S. Cl.
CPC .............. *E21B 49/00* (2013.01); *E21B 47/06* (2013.01)

(58) Field of Classification Search
CPC ...... E21B 49/00; E21B 47/06; E21B 2200/20; E21B 41/00; E21B 43/00; G06F 30/20
See application file for complete search history.

(56) References Cited

U.S. PATENT DOCUMENTS

2003/0196484 A1* 10/2003 Bowler, III .......... G01N 33/241
 73/19.01
2014/0083687 A1* 3/2014 Poe ........................ E21B 49/00
 166/250.1

FOREIGN PATENT DOCUMENTS

CN 106545336 A * 3/2017

OTHER PUBLICATIONS

Mahmoud et al. "EUR Prediction for Unconventional Reservoirs: State of the Art and Field Case." Paper presented at the SPE Trinidad and Tobago Section Energy Resources Conference, Port of Spain, Trinidad and Tobago, Jun. 2018. (Year: 2018).*

(Continued)

*Primary Examiner* — Alexander Satanovsky
*Assistant Examiner* — Asm Fakhruddin
(74) *Attorney, Agent, or Firm* — Dicke, Billig & Czaja, PLLC

(57) ABSTRACT

The present invention belongs to the technical field of oil and gas field development, and discloses a method for calculating a single-well controlled reserve of a low-permeability/tight gas reservoir and analyzing residual gas thereof. The method includes: calculating a reserve controlled by each gas well in a block by using a gas reservoir dynamic reserve calculation method; establishing a new reserve calculation formula for solution and comparative analysis by an example; and quantitatively analyzing an effect of a startup pressure gradient and a stress sensitivity on a calculation result of the single-well controlled reserve, wherein the analysis of the factors affecting reserve calculation shows that, when the startup pressure gradient reaches 0.02 MPa/m, the calculated reserve is significantly reduced compared with a conventional method, but when the startup pressure gradient is greater than 0.1 MPa/m, the effect gradually stabilizes.

4 Claims, 5 Drawing Sheets

(56) References Cited

OTHER PUBLICATIONS

Xu et al. "Case study: Numerical Simulation on Formation Damage in Low-permeability Gas Reservoir." Paper presented at the Nigeria Annual International Conference and Exhibition, Abuja, Nigeria, Jul. 2011 (Year: 2011).*

* cited by examiner

Maximum permeability damage rate $Dk_3$ / %

METHOD FOR CALCULATING SINGLE-WELL CONTROLLED RESERVE OF LOW-PERMEABILITY/TIGHT GAS RESERVOIR AND ANALYZING RESIDUAL GAS THEREOF

CROSS-REFERENCE TO RELATED APPLICATIONS

This application is based upon and claims priority to Chinese Patent Application No. 201910591594.0, filed on Jul. 2, 2019, the entire contents of which are incorporated herein by reference.

TECHNICAL FIELD

The present invention belongs to the technical field of oil and gas field development, and particularly relates to a method for calculating a single-well controlled reserve of a low-permeability/tight gas reservoir and analyzing residual gas thereof.

BACKGROUND

Natural gas features high heat of combustion, high utilization efficiency and high economic value. With the increasing production, low-permeability and tight gas reservoirs have become an important part of natural gas production in China and even the world. The reserve calculation of gas reservoirs plays an important role in gas reservoir development, such as the accurate evaluation of gas reservoirs, the formulation of development plans, and later reserve matching for numerical simulation. As low-permeability and tight gas reservoirs have poor physical properties, the formation pressure decreases rapidly, and the production will quickly enter a period of decline. Therefore, to improve the recovery percent of gas reservoirs, it is important to study how to exploit potential residual gas based on the distribution of residual gas.

Gas Reservoir D1 is located in the southwest of Gas Field D. It has three large strata, with no lacuna among them. The strata of Block D1 feature low porosity, low permeability and high heterogeneity. The strata have special seepage phenomena such as startup pressure gradient and stress sensitivity, which cause a large lateral change. The gas reservoir is a lithological trap gas reservoir with poor physical properties. Block D1 has a total of 52 gas wells. Gas Reservoir D1 has been put into production since the beginning of 2005. The production of single wells was low, and the production has entered a decline period until the beginning of February 2016. The daily production level has continued to decline, while the average formation pressure, oil pressure and casing pressure all have fallen sharply with a large formation energy loss.

1. Research Status of Low-Permeability Reservoirs

In 1941, Klinkenberg first proposed the concept of gas slippage effect. According to the concept, gas molecules at a tube wall are not completely stationary; instead, some of them are still active. Gas molecules between adjacent layers exchange momentum, and they directionally flow along the tube wall together with those at the tube wall, thus forming the so-called gas slippage. Based on the gas slippage effect, Klinkenberg proposed a mathematical expression of gas permeability:

$$K_g = K_0\left(1 + \frac{\gamma}{p}\right).$$

Around the 1970s, M C Leverett, W S Walls, George H. Fancher and M D Taylor et al. found through low-pressure experiments that for gas reservoir development, the gas slippage effect had a significant impact and needed to be considered only when a reservoir permeability was less than 0.1 mD. In 1968, A. A. Haning conducted gas breakthrough pressure experiments on rock samples of different permeability, and concluded that when the permeability of a rock was greater than $10^{-6}$ μm$^2$, the rock no longer had the ability to seal gas. In 1970, a petroleum department in North American proposed a gas reservoir classification standard, which classified sandstone reservoirs with $K_g<0.1$ mD as tight sandstone gas reservoirs. In 1973, the Federal Energy Regulatory Commission (NERC) proposed a new gas reservoir classification standard, which classified gas reservoirs with an average permeability less than 0.1 mD as tight sandstone gas reservoirs. In 1987, Changqing Oilfield in China conducted systematic and comprehensive experimental research on rock samples. In 1987, Zhang Dakui and Zhou Keming et al. from the Sichuan Research Institute studied a relationship between displacement efficiency and time by a three-dimensional liquid countercurrent imbibition experiment. They concluded that the reservoir was tight or even non-producing when φ<2.5% and K<$10^{-4}$ μm$^2$. If a gas reservoir had a maximum permeability of only 5 mD, it was regarded as a low-permeability or tight gas reservoir. A tight sandstone gas reservoir was one with φ<12%, K<$0.1\times10^{-3}$ μm$^2$, and $S_w$>40%, where gas flew slowly in a tight sandstone reservoir. From the perspective of gas reservoir engineering, the definition of the tight sandstone gas reservoir was modified as one with a permeability of $(0.001^{-10})\times10^{-3}$ μm$^2$, where a gas well could not produce an economic gas flow from a sandstone reservoir without large-scale hydraulic fracturing. As for the relationship between the slippage effect and reservoir permeability, it was believed that for cores with different permeability, a slippage coefficient b gradually decreased as an absolute permeability K∞ of the core increased. When the permeability of the core was less than 0.1 mD, the slippage effect was significant; otherwise it was ignorable. In 2011, China promulgated the Classification of Natural Gas Pool (GB/T 26979-2011), as shown in the following table.

| Class | Effective Permeability (mD) | Class | Porosity (%) |
|---|---|---|---|
| High permeability | >50 | High porosity | >20 |
| Medium permeability | 5-50 | Medium porosity | 10-20 |
| Low permeability | 0.1-5 | Low porosity | 5-10 |
| Tight | <0.1 | Ultra low porosity | <5 |

The effective permeability of gas reservoirs has a large effect on the startup pressure gradient of tight and low-permeability gas reservoirs. Under the same $S_w$, the startup pressure gradient gradually increases as the effective permeability decreases. In addition, a larger startup pressure gradient leads to a lower productivity under a certain pressure difference. Therefore, the effective permeability of a reservoir can be improved to reduce and eliminate the effect of the startup pressure gradient on production. In 2016, Zhang Xiaolong et al. pointed out that in low-permeability and tight gas reservoirs, stress sensitivity was closely related to various pressures (such as flowing down-hole pressure and formation pressure) and production pressure difference.

2. Research Status of Dynamic Reserve Calculation Methods

Volume method is a method calculating the reserve of gas reservoirs using static parameters. Although this method has a large error, it was ever applied in the Texas Bay of the United States and was instructive at that time. A material balance equation of reservoirs was studied based on Deussen's research results and was then widely used in various gas reservoirs. However, this equation had many problems. For example, it didn't consider the heterogeneity of the formation. Therefore, h. hurst and M. Muskat et al. later improved the material balance equation. Based on the research of Lewis, Beal and Cutler, three production decline curves and expressions were proposed according to data from field experience. These decline curves laid the foundation for the research of dynamic reserve forecast for gas reservoirs by using a later-production-based decline method. Take Yumen Oilfield as an example, the reserve of Yumen Oilfield was evaluated by referring to the methods of the Soviet Union, and Soviet oilfield experts were invited for review and discussion after the completion of the reserve evaluation. Based on this, the development plan of Yumen Oilfield was prepared. Lewis Beai and Cutler are pioneers in the study of production decline trends. The calculation of reserves using the production decline method benefited from the appearance of Arps curves, and a single-well controlled dynamic reserve could be interpreted by using a buildup curve. In the late 1870s, R. W. Jackson applied a method proposed by Parkfones to conduct a large number of field experiments in some gas fields in the Ohio of the United States. His experimental results were reasonable and instructive for the development of this theory. In the 1950s and 1960s, well test technology was widely used. After the 1970s, the rapid development of computers promoted the further development of well test, and some scholars proposed modern well test technology. Since then, well-test-based reserve calculation methods had developed by leaps and bounds. The commonly used gas field calculation methods, such as pressure drop test and pressure draw-down test, were developed on the basis of the well testing technology. In 1963, Havlena and A. S. Odeh proposed a dynamic reserve calculation method using the pressure drop method. However, in practical use, this method produced a large error in the calculation of water drive gas reservoirs. In 1980, M. J. Fetkovich et al. studied a standard production-time curve. Their most important achievement was the combination of the theoretical production decline curve with Arps' empirical production decline curve, which clearly showed a boundary effect and the decline of gas production. In 2000, Lawrence et al. studied the Fetkovich decline curve, and added a method for calculating a single-well dynamic reserve of linear-flow low-permeability and tight gas reservoirs to the decline curve. In 2001, Song Shemin et al. used Aronnofsky's production decline model as a prototype, and re-established a relationship model between period production and time. This model improved the relationship between recovery percent and time, and greatly reduced the error. In theory, the new model could accurately forecast the law of production decline and the single-well dynamic reserve. In 2006, R. Aguilera provided a new material balance equation. The equation had less error in calculation because the mathematical model considered the effective compressibility of a matrix, the effective compressibility of fractures, and the characteristic data of stress sensitivity. Horizontal wells were used to develop low-permeability and tight gas reservoirs. Thus, special technologies, such as reservoir forecast and fine description technology, horizontal well optimal deployment and design technology and horizontal well multistage transformation technology were produced. They were important for the development of low-permeability and tight gas reservoirs using horizontal wells. In 2015, Guo Qi et al. established a multi-objective function based on a flowing material balance (FMB) method, and introduced an iterative approximation method to calculate the dynamic reserve of gas reservoirs. This method solved the problem of little measured data and large production fluctuations which caused errors. It was a new method for solving a non-linear seepage equation of low-permeability and tight gas reservoirs. Further, a modified binomial productivity equation was established, which provided a reference for dynamic reserve calculation.

In recent years, with the extensive research of global oil and gas field development experts, modern production decline analysis method, including Palacio-Blasingame type curve, Agarwal-Gardner (A-G) type curve, normalized pressure integral (NPI) type curve, FMB method and model method (non-bounded special reservoirs, bounded rectangular reservoirs), have been rapidly developed. In the Blasingame analysis method, the pressure-derivative type curve becomes smooth due to the proposed concept of flow integral. However, a small error of early data will have a great impact on the calculation of the flow integral. The A-G method can easily identify different unsteady flow periods. When $t_{Da}=0.1$, an infinite acting flow gradually transits to a boundary-dominated flow, which is a vertical line like all type curves. The FMB method is simple and intuitive. It can analyze and estimate fluid reserves without a shut-in pressure. Because the data is plotted on a linear scale, the method is more convenient to estimate fluid reserves than type curves. Type curves are logarithmic and compress later data to some extent. However, they are only applicable for the depletion of oil and gas reservoirs.

3. Research Status of Residual Gas in Low-Permeability and Tight Gas Reservoirs

In 2003, Wang Xibin et al. pointed out that residual gas distribution could be studied indirectly by studying formation pressure distribution. This method had been verified to be correct and feasible. At the same time, Wang Xibin et al. based on the Penglaizhen gas reservoir in Xinchang to establish an approximate function between recovery percent and formation pressure. In 2003, Mark E. Deptuck et al. used geological modeling to study the upper part of the Niger Delta slope in the Arabian Sea. Their analysis of the upper part strata provided an important reference for the fine description of reservoirs and the study of the law of later residual gas distribution. In 2005, Wang Zhen found through numerical simulation that most residual gas in low-permeability and tight gas reservoirs was distributed between local high points and production wells due to the reservoir structure and well pattern. The research of residual gas distribution needed to be based on the fine description of gas reservoirs. The fine description of gas reservoirs and residual gas could be realized by oil and gas reservoir simulation. At the same time, Liu Zhengzhong proposed a new residual gas classification standard by studying the distribution characteristics of different residual gas. In 2009, Lei Qun et al. proposed three residual gas distribution models for low-permeability sandstone gas reservoirs and provided corresponding suggestions for potential exploitation. In 2011, Wenhua et al. proposed several parameters to reflect reservoir heterogeneity. They believed that reservoir heterogeneity well corresponded to residual gas saturation. In 2011, Wang Yuelin concluded through research that interlayer, interlayer interference and formation heterogeneity all had a significant effect on the residual gas distribution of low-permeability and tight gas reservoirs. In 2016, Yang Hongtuo used gas well test and production data for production history matching and formation pressure history matching for gas reservoir simulation, and proposed a new residual gas classification standard, which divided residual gas reserves into I, II and III categories. In 2017, Guo Qi et al. proposed that numerical simulation could be used to quantitatively describe the residual gas of gas reservoirs. The main indicators to describe residual gas distribution include formation pressure distribution map and gas saturation map, etc. This method can be used for the quantitative residual gas description of low-permeability and tight gas reservoirs.

4. Research Status of Numerical Simulation of Low-Permeability and Tight Gas Reservoirs In 1953, Bruce and Peaceman et al. first proposed and used a numerical method to solve underground oil and gas reservoir seepage. They numerically simulated a one-dimensional gas-phase unsteady linear flow and a one-dimensional gas-phase unsteady radial flow. In 1959, some scholars in the United States first researched two-phase two-dimensional numerical simulation. They considered the influence of density $\rho$, phase permeability $K_r$, viscosity $\mu$, capillary force $P_c$ and gravity, etc., and made the research the origin of modern numerical simulation technology. Since the 1970s, with the rapid development of science and technology, computer software and hardware have developed rapidly. Based on this, oil and gas reservoir simulation has made great progress in terms of algorithms, efficiency and stability, etc. At the beginning, a direct solver was used for numerical simulation. The solution was difficult due to local mesh encryption, dead grid nodes and continuous grid nesting. To solve the problem, Tauler proposed a preconditioned conjugate-gradient (PCG) method. The method strengthened the convergence of numerical solution, which made a great contribution to the improvement of calculation speed. In the 1980s, due to the appearance of adaptive implicit and fully implicit methods, the numerical solution developed greatly. The principle lied in the use of different implicit degrees to deal with different grid nodes and time steps. In this way, the calculation method was not fixed, but more flexible. Further, the amount of calculation was reduced while the operation stability was enhanced, thereby greatly improving the calculation speed and accuracy. In 1994, Canadian scholar Houlding first proposed the concept of structure and attribute models to describe reservoirs. He is now the pioneer of geological modeling. In 2009, Guo Ping and Zhang Maolin et al. proposed that the non-Newtonian (non-Darcy, non-linear) seepage characteristics of fluids and the permeability stress sensitivity of rocks should be considered to establish a numerical simulation theory to describe the development characteristics of low-permeability oil and gas reservoirs. They pointed out that numerical simulation software should be developed to meet the needs of theoretical research and practical application in function and operation. In that year, Zhang Maolin et al. proposed to perform numerical simulation based on reserve matching and production history matching to forecast and compare gas well production indicators, such as daily gas production, recovery percent and stable production period under different well layouts, different well spacings and different gas recovery rates, so as to formulate an optimal production plan.

In summary, the prior art cannot solve the problems of Block D1 as follows:

(1) The strata of Block D1 feature low porosity, low permeability, poor physical properties of reservoir, high heterogeneity and large lateral changes in the reservoir. The gas reservoir is a lithological trap gas reservoir with special seepage phenomena such as startup pressure gradient and stress sensitivity. Both the startup pressure gradient and the stress sensitivity affect the seepage of fluids in the reservoir, leading to a reduction in the controlled range and controlled reserve of a single well. Therefore, the forecast accuracy of single-well controlled reserve and residual gas is reduced.

(2) There are 52 gas wells in Block D1. Gas Reservoir D1 has been put into production since the beginning of 2005. The production of single wells was low, and the production has entered a decline period. The daily production level has continued to decline, while the average formation pressure, oil pressure and casing pressure all have fallen sharply with a large formation energy loss. Unbalanced pressures lead to a large difference in the effect of a startup pressure gradient and stress sensitivity on the seepage in the tight gas reservoir. Therefore, it is urgently needed to figure out the effect law of the startup pressure gradient and the stress sensitivity on the single-well controlled dynamic reserve and residual gas.

SUMMARY

To solve the problems in the prior art, the present invention provides a method for calculating a single-well controlled reserve of a low-permeability/tight gas reservoir and analyzing residual gas thereof.

The present invention is implemented as follows: a method for calculating a single-well controlled reserve of a low-permeability/tight gas reservoir and analyzing residual gas thereof, including:

calculating a reserve controlled by each gas well in a block: calculating a dynamic reserve controlled by each of multiple single wells in the block by using a material balance method and a modern production decline analysis method, where the modern production decline analysis method includes a Fetkovich type curve method, a Blasingame production decline method, an Agarwal-Gardner (A-G) production decline method and a flowing material balance method; and establishing a new method for calculating a single-well controlled reserve of the low-permeability and tight gas reservoirs by considering an effect of a startup pressure gradient and a stress sensitivity, where a comparative analysis with a calculation result of a conventional method shows that, as the new method considers the effect of the startup pressure gradient and the stress sensitivity, a dynamic reserve calculated by the new method is lower than the result calculated by the conventional method, and the result calculated by the new method is more consistent with low-permeability and tight reservoirs.

The new method for calculating the single-well controlled reserve and residual gas of the low-permeability and tight gas reservoirs established on the basis of the startup pressure gradient and the stress sensitivity includes:

a pressure p at a certain point in a formation of the gas reservoir is expressed as a function of a position r and a time t:

$$p=p(r,t) \quad (1)$$

a motion equation of unsteady gas seepage considering the effect of the startup pressure gradient is:

$$\frac{\partial p}{\partial r} - c = \frac{\mu v}{0.001K} + \alpha\rho(2.4\times10^5 v')^2 \quad (2)$$

where, a second term in the right of equal sign describes near-wellbore high-speed non-Darcy seepage; v' is approximately expressed as:

$$v' = \frac{1}{2\pi hr} \cdot \frac{p_{sc}ZT}{T_{sc}p} q_{sc} \quad (3)$$

therefore, v in the formula is expressed as:

$$v = \frac{0.001K}{\mu}\left[\frac{\partial p}{\partial r} - c - \alpha\rho(2.4\times10^5 v')^2\right] \quad (4)$$

a continuity equation of gas seepage is:

$$\frac{\partial(\rho v)}{\partial r} = -\frac{\partial(\rho\varphi)}{\partial t} \quad (5)$$

a state equation of gas seepage is:

$$pV = ZnRT \quad (6)$$

where, the effect of the stress sensitivity is characterized by a maximum permeability damage value; considering a slippage effect and the stress sensitivity, a permeability is expressed as:

$$K = K_0(1 - D_{k3})\left(1 + \frac{\gamma}{p_i}\right) \quad (7)$$

according to field experience, a relationship between the block's startup pressure gradient and permeability is:

$$c = 0.0672e^{-0.723K_0} \quad (8)$$

a relationship between a turbulence factor and the permeability is further obtained:

$$\alpha = \frac{1.15\times10^9}{K_0\Phi} \quad (9)$$

when a reservoir permeability is less than 0.1 mD, a relationship between a slip coefficient and the permeability is:

$$\gamma = 0.86_0^{-0.33} \quad (10)$$

through a sampling test of a fluid from the analysis block, a relationship between a deviation factor Z and an average formation pressure $\bar{p}$ is obtained:

$$Z = 0.000365\bar{p}^2 - 0.008726\bar{p} + 0.936954 \quad (11)$$

where, a regression coefficient $R^2 = 0.9979$, showing a good regression effect; equations 1 to 4 are combined with equations 6 to 11, and a combination result is brought into the continuity equation (5) to obtain a differential equation of gas seepage in the low-permeability and tight gas reservoirs, which considers the slippage effect, the startup pressure gradient and the permeability stress sensitivity:

$$\left(\frac{\partial p}{\partial r}\right)^2 - \frac{\partial p}{\partial r}\left[0.0672e^{-0.723k_0} + \frac{16.56\times10^{18}\rho}{K_0\varphi} \cdot \frac{p_{sc}^2 Z^2 T^2 q_{sc}^2}{T_{sc}^2 p^2 h^2 \pi^2 r^2}\right] + \quad (12)$$

$$p\frac{\partial^2 p}{\partial r^2} = -\frac{\partial p}{\partial t} \cdot \frac{\varphi\mu}{0.001K_0(1-D_{k3})\left(1+\frac{\gamma}{p_i}\right)}$$

where, $q_{sc}$ is a function of time t, and a specific function relationship is determined by regression and matching of actual production data:

$$q_{sc} = F(t) \quad (13)$$

the equation (13) is substituted into the equation (12) to obtain:

$$\left(\frac{\partial p}{\partial r}\right)^2 - \frac{\partial p}{\partial r}\left[0.0672e^{-0.723k_0} + \frac{16.56\times10^{18}\rho}{K_0\varphi}\frac{p_{sc}^2 Z^2 T^2 F^2(t)}{T_{sc}^2 p^2 h^2 \pi^2 r^2}\right] + \quad (14)$$

$$p\frac{\partial^2 p}{\partial r^2} = -\frac{\partial p}{\partial t} \cdot \frac{\varphi\mu}{K_0(1-D_{k3})\left(1+\frac{\gamma}{p_i}\right)}$$

where an initial condition and a boundary conditions are:
initial condition:

$$p(r,0) = p_i \quad (15)$$

internal boundary condition:

$$r\frac{\partial p}{\partial r}\bigg|_{r=r_w} = \frac{6.37F(t)\mu ZT}{Khp} \quad (16)$$

external boundary condition:

$$\frac{\partial p}{\partial r}\bigg|_{r=r_e} = c \quad (17)$$

under the initial condition (15) and the boundary conditions (16) and (17), the partial differential equation (14) is solved to obtain the relationship between the formation pressure p and the position r and the time t.

Further, a time point t is selected at a certain time step, and an average formation pressure $\bar{p}$ at the time t is calculated by using an area weighting method, including:

(1) taking a point every other $$\frac{r_e}{10}$$

from a well center to a control radius, and taking a total of 10 points;

(2) calculating an area weight $S_i$ corresponding to an i-th point from the well center to the control radius (because $r_w \ll r_e$, a value of $r_w$ is ignored):

$$S_i = \pi\left(\frac{ir_e}{10}\right)^2 - \pi\left[\frac{(i-1)r_e}{10}\right]^2 \quad i = 1, 2, 3 \ldots 10 \quad (18)$$

(3) calculating an area weighted average pressure:

$$\bar{p} = \sum_{r=r_w}^{r_e} \frac{p_i S_i}{S} \quad (19)$$

where, S is a total well-controlled area:

$$S = \pi r_e^2 \quad (20)$$

regressing according to the actual production data to obtain a functional relationship between $G_p$ and t, and then bringing t to the cumulative gas production $G_p$ at the time; plotting a relationship diagram of $\bar{p}/Z$ and $G_p$ by using the material balance method, selecting production data of the well in a pseudo-steady state flow, that is, data approximated into a straight line by the relationship curve of $\bar{p}/Z$ and $G_p$ for linear regression, and extending a straight line segment to an abscissa axis, where an abscissa value of an intersection is the single-well controlled reserve.

Further, a comparative analysis of the calculation results of the new method and the conventional method is carried out.

Another objective of the present invention is to provide a computer program for implementing the method for calculating a single-well controlled reserve of a low-permeability/tight gas reservoir and analyzing residual gas thereof.

Another objective of the present invention is to provide an information data processing terminal for implementing the method for calculating a single-well controlled reserve of a low-permeability/tight gas reservoir and analyzing residual gas thereof.

Another objective of the present invention is to provide a computer-readable storage medium, including an instruction, where when running on a computer, the instruction enables the computer to implement the method for calculating a single-well controlled reserve of a low-permeability/tight gas reservoir and analyzing residual gas thereof.

Another objective of the present invention is to provide an analysis platform for implementing the method for calculating a single-well controlled reserve of a low-permeability/tight gas reservoir and analyzing residual gas thereof.

In summary, the present invention has the following advantages and positive effects: Compared with the existing methods, the present invention considers the special seepage phenomena such as startup pressure gradient and permeability stress sensitivity. The single-well controlled dynamic reserve in Block D1 calculated by the new formula considering the low-permeability seepage characteristics is lower. In this way, the present invention modifies the single-well controlled dynamic reserve and makes the result more accurate. Finally, the single-well controlled dynamic reserve in Block D1 totals 30.083>10$^8$ m$^3$. The analysis of the factors affecting the calculated reserve shows that when the startup pressure gradient reaches 0.02 MPa/m, the calculated reserve decreases significantly, and a higher reservoir stress sensitivity indicates a lower calculated reserve.

The present invention deduces the reserve calculation method by considering the startup pressure gradient and the stress sensitivity and analyzes the method by an example. The present invention accurately forecasts the dynamic change of the single-well controlled reserve of the low-permeability and tight gas reservoirs with the time and period of development under the influence factors of non-linear seepage (startup pressure gradient and stress sensitivity). The method has a certain value of theoretical and practical application for accurately determining the single-well controlled dynamic reserve of low-permeability and tight gas reservoirs and formulating a plan for exploiting potential residual gas.

and a cumulative production $G_{pt}$ provided by an embodiment of the present invention.

Figure 6:
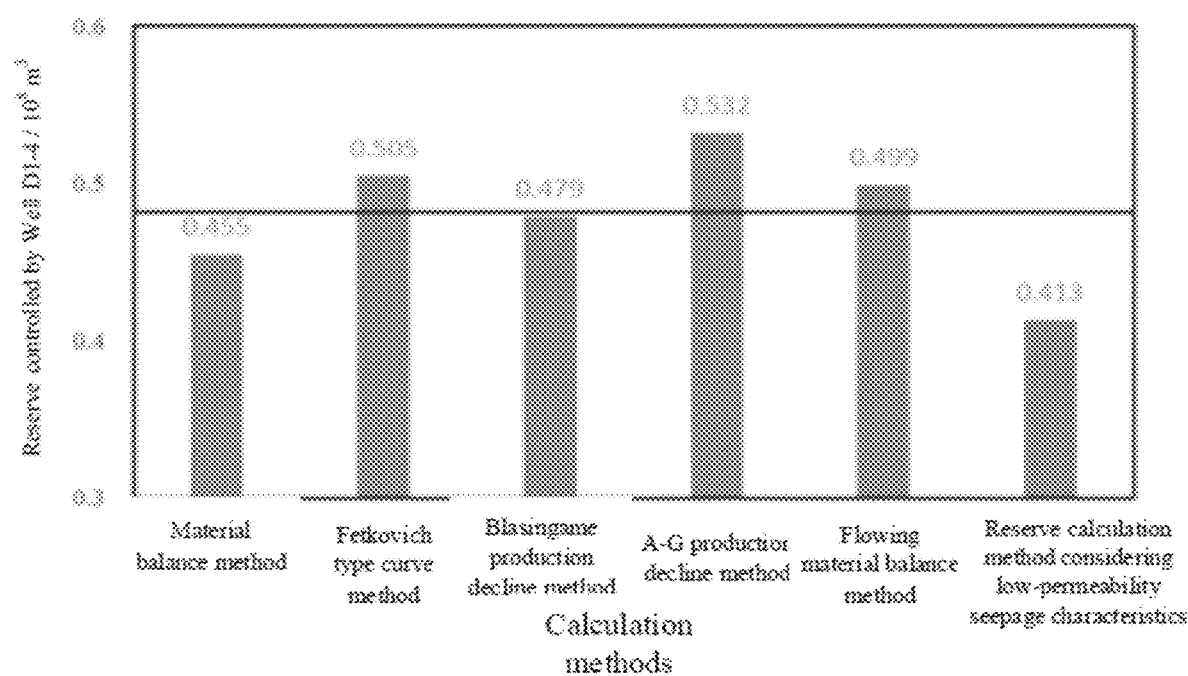

FIG. 6 is a comparison of a reserve controlled by Well D1-4 calculated by a method provided by an embodiment of the present invention.

Figure 7:
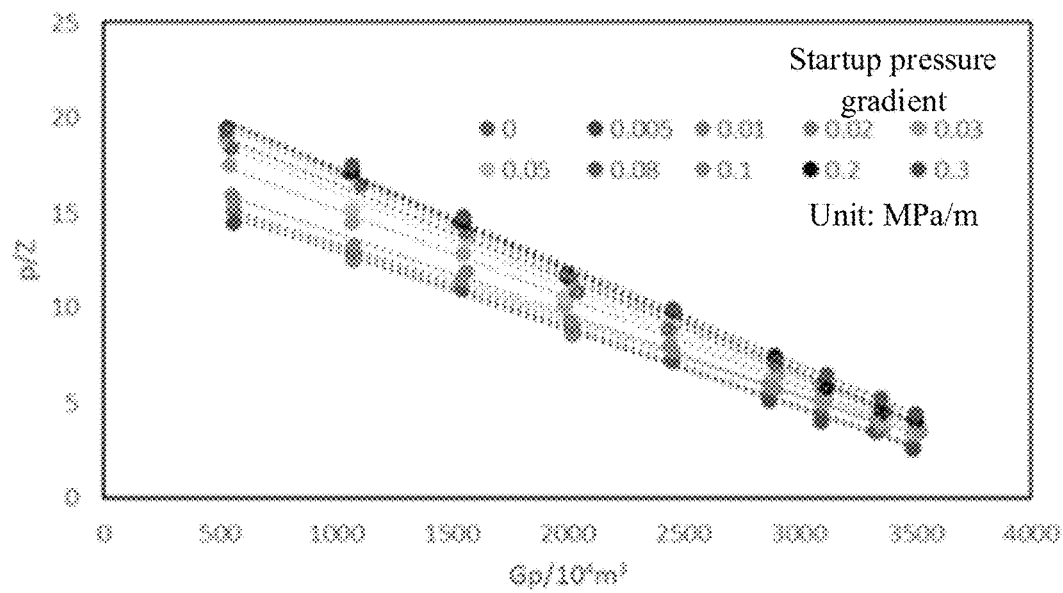

FIG. 7 is a relationship curve between $\bar{p}/Z$ and $G_p$ under a startup pressure gradient provided by an embodiment of the present invention.

Figure 8:
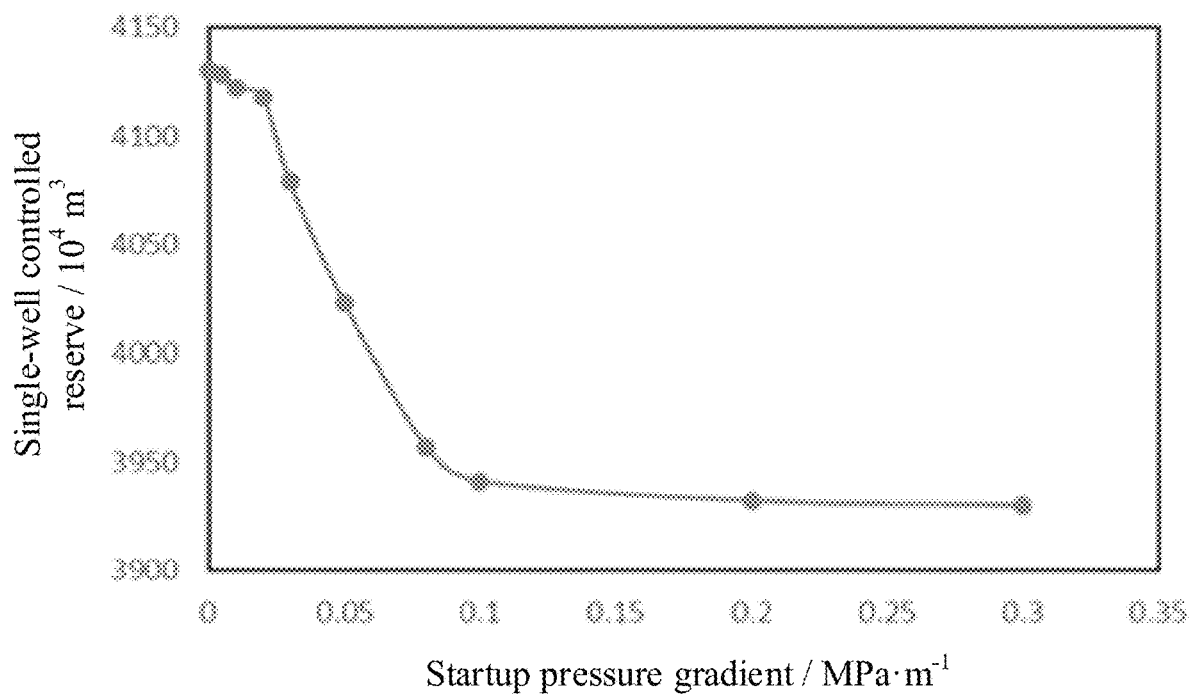

FIG. 8 is a statistical diagram of a single-well controlled dynamic reserve under a startup pressure gradient provided by an embodiment of the present invention.

Figure 9:
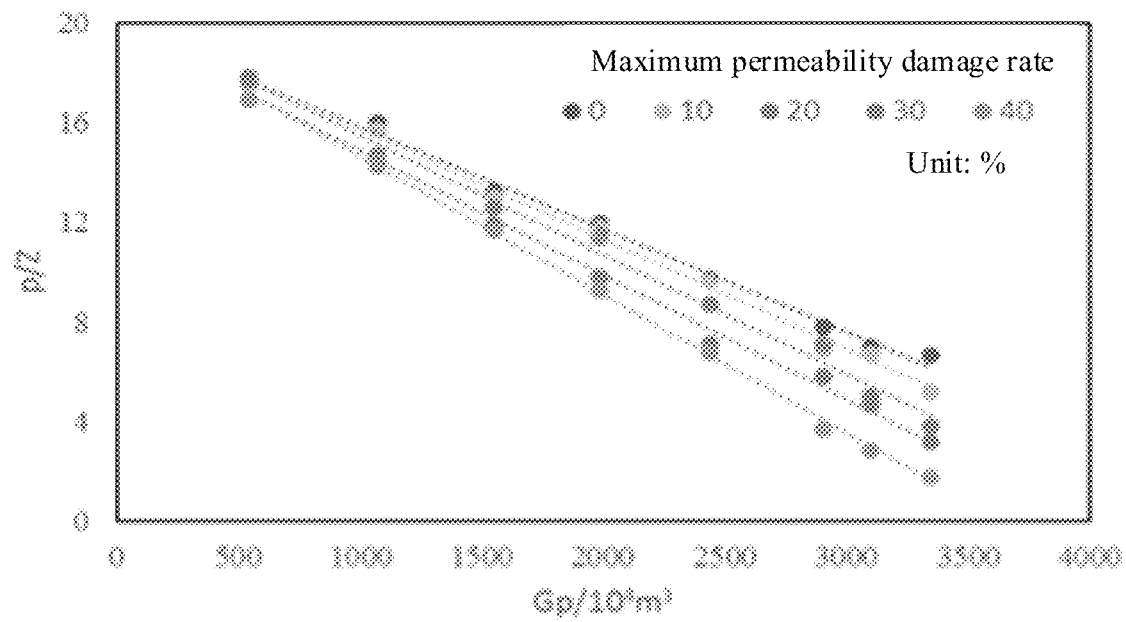

FIG. 9 is a relationship curve between $\bar{p}/Z$ and $G_p$ under a maximum permeability damage rate provided by an embodiment of the present invention.

Figure 10:
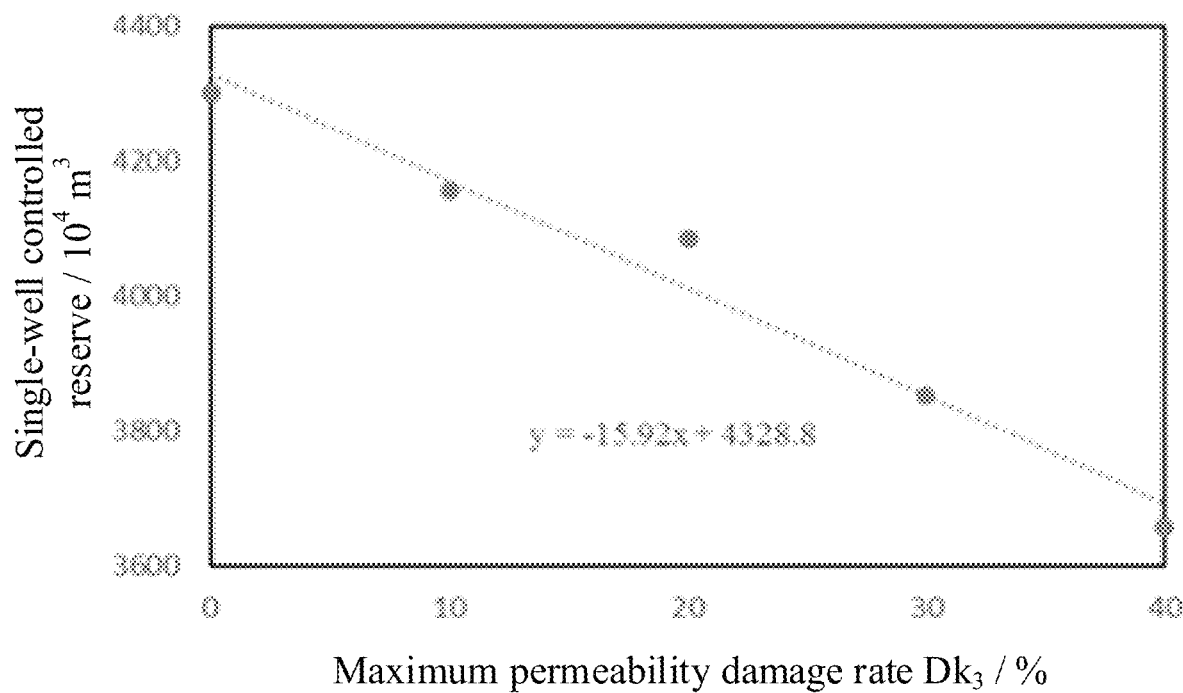

FIG. 10 is a statistical diagram of a single-well controlled dynamic reserve under a maximum permeability damage rate provided by an embodiment of the present invention.

DETAILED DESCRIPTION

In order to make the objectives and advantages of the present invention clearer and more comprehensible, the present invention is described in further detail below with reference to the embodiments. It should be understood that the described embodiments are merely intended to explain the present invention, rather than to limit the present invention.

The present invention is described in further detail with reference to the accompanying drawings.

An embodiment of the present invention provides a method for calculating a single-well controlled reserve of a low-permeability/tight gas reservoir and analyzing residual gas thereof, including:

calculate a reserve controlled by each gas well in a block:
calculate a dynamic reserve controlled by each of multiple single wells in the block by using a material balance method and a modern production decline analysis method, where the modern production decline analysis method includes a Fetkovich type curve method, a Blasingame production decline method, an Agarwal-Gardner (A-G) production decline method and a flowing material balance method; and establish a new method for calculating the single-well controlled reserve of the low-permeability and tight gas reservoirs on the basis of the startup pressure gradient and the stress sensitivity, where the startup pressure gradient and the stress sensitivity both will cause a low calculation result.

Figure 1:
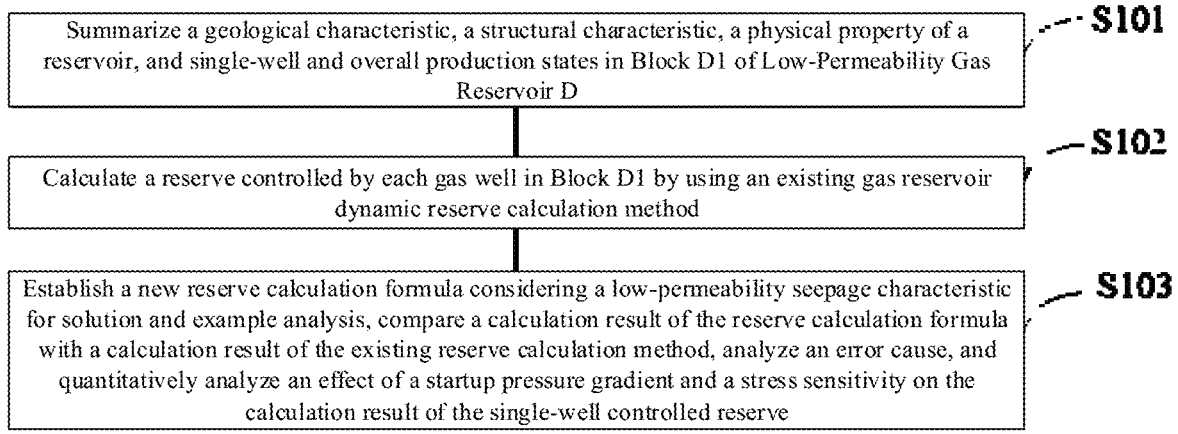
FIG. 1 is a flowchart of a method for calculating a single-well controlled reserve of a low-permeability/tight gas reservoir and analyzing residual gas thereof provided by an embodiment of the present invention.
Figure 2:
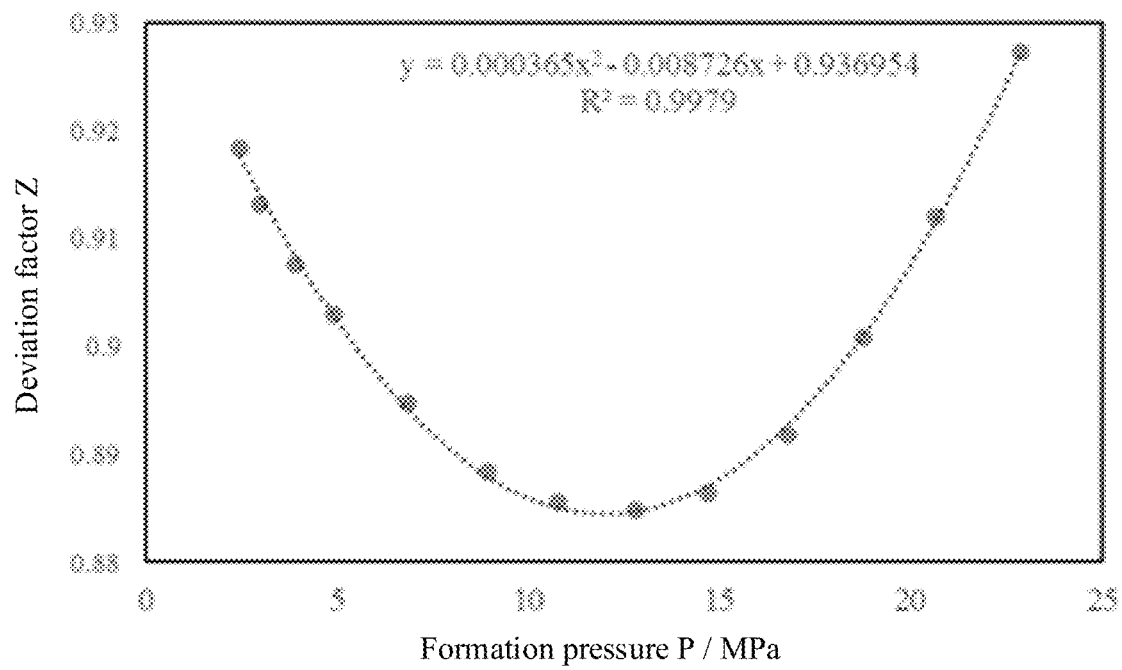
FIG. 2 is a diagram showing a relationship between a formation pressure and a deviation factor provided by an embodiment of the present invention.
Figure 3:
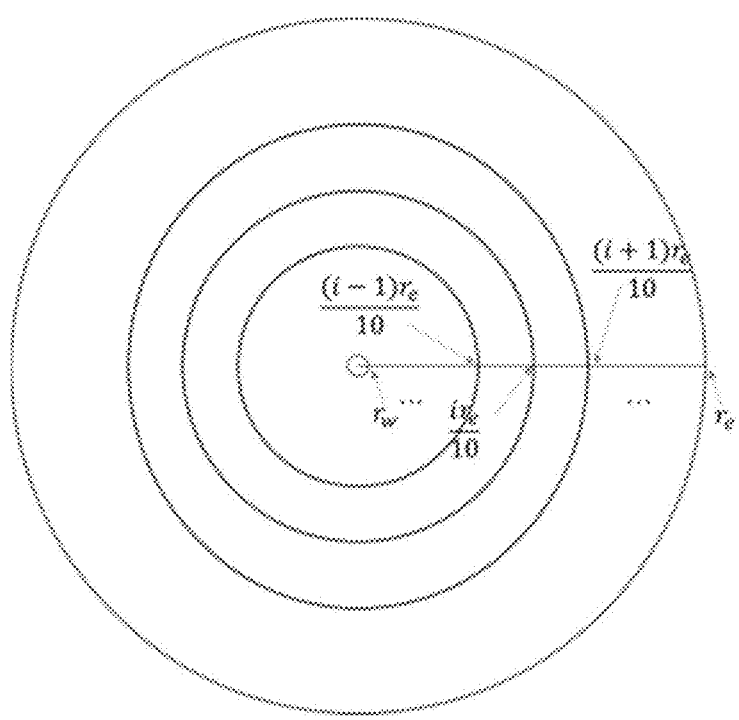
FIG. 3 is a diagram showing calculation of an area weight provided by an embodiment of the present invention.

As shown in FIG. 1, an embodiment of the present invention provides a method for calculating a single-well controlled reserve of a low-permeability/tight gas reservoir and analyzing residual gas thereof, including:

S101: summarize a geological characteristic, a structural characteristic, a physical property of a reservoir, and single-well and overall production states in Block D1 of low-permeability and tight gas reservoirs D;

S102: calculate a reserve controlled by each gas well in Block D1 by using an existing gas reservoir dynamic reserve calculation method; and S103: establish a new reserve calculation formula considering a low-permeability seepage characteristic for solution and example analysis, compare a calculation result of the reserve calculation formula with a calculation result of the existing reserve calculation method, analyze an error cause, and quantitatively analyze an effect of a startup pressure gradient and a stress sensitivity on the calculation result of the single-well controlled reserve.

In this embodiment, in step S102, the existing dynamic reserve calculation method used for calculating the reserve controlled by each gas well in Block D1 includes a material balance method and a modern production decline analysis method, such as a Fetkovich type curve method, a Blasingame production decline method, an Agarwal-Gardner production decline method and a flowing material balance method.

In this embodiment, in step S103, a new reserve calculation formula is established based on a special seepage characteristic such as the startup pressure gradient and the stress sensitivity in the low-permeability and tight gas reservoirs.

In this embodiment, in step S103, the new reserve calculation formula considering the low-permeability seepage characteristic is specifically deduced as follows:

a pressure p (unit: MPa) at a certain point in a formation of the gas reservoir is expressed as a function of a position r (a distance from a well center, unit: m) and a time t (unit: h):

$$p = p(r,t) \quad (1)$$

a motion equation of unsteady gas seepage considering the effect of the startup pressure gradient is:

$$\frac{\partial p}{\partial r} - c = \frac{\mu v}{0.001K} + \alpha \rho (2.4 \times 10^5 v')^2 \quad (2)$$

where, a second term in the right of equal sign describes near-wellbore high-speed non-Darcy seepage; v' is approximately expressed as:

$$v' = \frac{1}{2\pi hr} \cdot \frac{p_{sc}ZT}{T_{sc}p} q_{sc} \quad (3)$$

therefore, v in the formula is expressed as:

$$v = \frac{0.001K}{\mu}\left[\frac{\partial p}{\partial r} - c - \alpha\rho(2.4 \times 10^5 v')^2\right] \quad (4)$$

a continuity equation of gas seepage is:

$$\frac{\partial(\rho v)}{\partial r} = -\frac{\partial(\rho \varphi)}{\partial t} \quad (5)$$

a state equation of gas seepage is:
$$pV = ZnRT \quad (6)$$

where, the effect of the stress sensitivity is characterized by a maximum permeability damage value; considering a slippage effect and the stress sensitivity, a permeability is expressed as:

$$K = K_0(1 - D_{k3})\left(1 + \frac{\gamma}{p_i}\right) \quad (7)$$

according to field experience, a relationship between Block D1's startup pressure gradient and permeability is:
$$c = 0.0672 e^{-0.723K_0} \quad (8)$$

relationship between a turbulence factor and the permeability is further obtained:

$$\alpha = \frac{1.15 \times 10^9}{K_0 \Phi} \quad (9)$$

when a reservoir permeability is less than 0.1 mD, a relationship between a slip coefficient and the permeability is:
$$\gamma = 0.86 K_0^{-0.33} \quad (10)$$

through a sampling test of a fluid from the research block, a relationship between a deviation factor Z and an average formation pressure $\bar{p}$ is obtained:
$$Z = 0.000365\bar{p}^2 - 0.008726\bar{p} + 0.936954 \quad (11)$$

where, a regression coefficient $R^2 = 0.9979$, showing a good regression effect;

equations 1 to 4 are combined with equations 6 to 11, and a combination result is brought into the continuity equation 5 to obtain:

$$\left(\frac{\partial p}{\partial r}\right)^2 - \frac{\partial p}{\partial r}\left[0.0672 e^{-0.723k_0} + \frac{16.56 \times 10^{18}\rho}{K_0\varphi} \cdot \frac{p_{sc}^2 Z^2 T^2 q_{sc}^2}{T_{sc}^2 p^2 h^2 \pi^2 r^2}\right] + p\frac{\partial^2 p}{\partial r^2} = -\frac{\partial p}{\partial t} \cdot \frac{\varphi\mu}{0.001K_0(1 - D_{k3})\left(1 + \frac{\gamma}{p_i}\right)} \quad (12)$$

where, (12) is a differential equation of gas seepage in the low-permeability and tight gas reservoirs, which considers the slippage effect, the startup pressure gradient and the permeability stress sensitivity;

where, $q_{sc}$ is a function of time t, and a specific function relationship is determined by regression and matching of actual production data:
$$q_{sc} = F(t) \quad (13)$$

the equation (13) is substituted into the equation (12) to obtain:

$$\left(\frac{\partial p}{\partial r}\right)^2 - \frac{\partial p}{\partial r}\left[0.0672 e^{-0.723 k_0} + \frac{16.56 \times 10^{18} \rho}{K_0 \varphi} \frac{p_{sc}^2 Z^2 T^2 F^2(t)}{T_{sc}^2 p^2 h^2 \pi^2 r^2}\right] + \quad (14)$$

$$p\frac{\partial^2 p}{\partial r^2} = -\frac{\partial p}{\partial t} \cdot \frac{\varphi \mu}{K_0(1-D_{k3})\left(1+\frac{\gamma}{p_i}\right)}$$

where an initial condition and a boundary conditions are:
initial condition:

$$p(r,0)=p_i \quad (15)$$

internal boundary condition:

$$r\frac{\partial p}{\partial r}\bigg|_{r=r_w} = \frac{6.37 F(t)\mu ZT}{Khp} \quad (16)$$

external boundary condition:

$$\frac{\partial p}{\partial r}\bigg|_{r=r_e} = c \quad (17)$$

under the initial condition (15) and the boundary conditions (16) and (17), the partial differential equation (14) is solved to obtain the relationship between the formation pressure p and the position r and the time t.
a time point t is selected at a certain time step, and an average formation pressure $\bar{p}$ at the time t is calculated by using an area weighting method, including:
(1) take a point every other $$\frac{r_e}{10}$$

from a well center to a control radius, and take a total of 10 points;
(2) calculate an area weight $S_i$ corresponding to an i-th point from the well center to the control radius (because $r_w \ll r_c$, a value of $r_w$ is ignored):

$$S_i = \pi\left(\frac{ir_e}{10}\right)^2 - \pi\left[\frac{(i-1)r_e}{10}\right]^2 \quad i=1, 2, 3 \ldots 10 \quad (18)$$

(3) calculate an area weighted average pressure:

$$\bar{p} = \sum_{r=r_w}^{r_e} \frac{p_i S_i}{S} \quad (19)$$

where, S is a total well-controlled area:

$$S = \pi r_e^2 \quad (20)$$

regress according to the actual production data to obtain a functional relationship between $G_p$ and t, and then bring t to the cumulative gas production $G_p$ at the time; plot a relationship diagram of $\bar{p}/Z$ and $G_p$ by using the material balance method, select production data of the well in a pseudo-steady state flow, that is, data approximated into a straight line by the relationship curve of $\bar{p}/Z$ and $G_p$ for linear regression, and extend a straight line segment to an abscissa axis, where an abscissa value of an intersection is the single-well controlled reserve.

Embodiment 1

The Calculation Process of the Method is Analyzed by Taking Well D1-4 as an Example Well D1-4 is located north of the middle of Block D1. It started production in July 2005. A production horizontal is H3-1 and a production interval is from 2,665 m to 2,670 m. An average porosity of this interval near the well is 12.18%, and an average original permeability is 1.17 mD. As of December 2016, the well had been closed for a total of 48 days. A maximum daily gas production was $1.99 \times 10^4$ m³/d, an average daily gas production was $0.75 \times 10^4$ m³/d, and a cumulative gas production was $0.31 \times 10^8$ m³.

The parameters of Well D1-4 and the production interval required for calculation are shown in Table 1, where the slippage effect term in equation (14) is ignored when the permeability is greater than 0.1 mD.

TABLE 1

Parameters of Well D1-4 and production interval

| Parameter and Unit | Value | Parameter and Unit | Value |
|---|---|---|---|
| Wellbore radius $r_w$/m | 0.072 | Original average permeability $K_0$/mD | 1.17 |
| Average viscosity of natural gas $\mu$/mPa·s | 0.0138 | Maximum permeability damage rate $D_{k3}$/% | 22.68 |
| Original formation pressure $p_i$/MPa | 25.4 | | |
| Original gas deviation factor $Z_i$ | 0.99 | Average gas deviation factor Z | 0.89 |
| Formation temperature T/K | 359 | Surface pressure $p_{sc}$/MPa | 0.1 |
| Surface temperature $T_{sc}$/K | 293 | Thickness of gas reservoir h/m | 5.1 |
| Porosity of gas reservoir $\Phi$ (%) | 12.18 | Natural gas density $\rho$/kg·m⁻³ | 0.802 |
| | | Supply radius $r_e$/m | 421 |

The daily gas production $q_{sc}$ (unit: $10^4$ m³/d) is regressed and matched as a function of time t (unit: h) according to actual production data, which is expressed as follows:

$$q_{sc} = 0.076823 e^{-0.0000369 t}$$

These parameters are put into the formula to obtain:

$$\left(\frac{\partial p}{\partial r}\right)^2 - \frac{\partial p}{\partial r}\left[0.0288 + \frac{3.653 \times 10^{13} e^{-0.0000738 t}}{p^2 r^2}\right] + p\frac{\partial^2 p}{\partial r^2} = -1.858 \frac{\partial p}{\partial t}$$

where, an initial condition and a boundary conditions are:
initial condition:

$$p(r,0)=25.4$$

internal boundary condition:

$$\left.\frac{\partial p}{\partial r}\right|_{r=0.074} = \frac{5.022e^{-0.0000369t}}{p}$$

external boundary condition:

$$\left.\frac{\partial p}{\partial r}\right|_{r=421} = 0.029$$

The partial differential equation is solved numerically using matrix laboratory (MATLAB) software, where a step value of r is 100 m and a step value of time t is 90 h.

Figure 4:
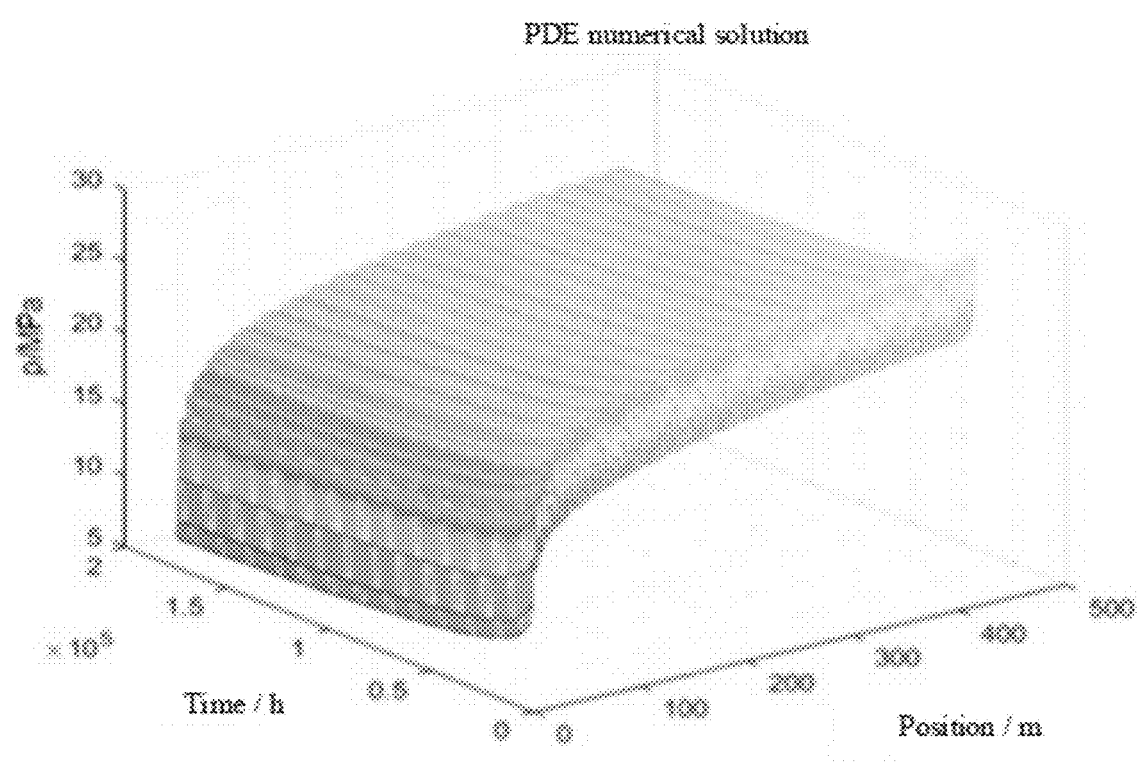
FIG. 4 is a diagram showing formation pressure distribution solved by an embodiment of the present invention.

FIG. 4 shows a numerical result solved by p=p(r,t).

As shown in FIG. 4, at the same time, a closer position to a wellbore indicates a smaller formation pressure with a greater pressure drop. At the same position, the formation pressure decreases with time and the pressure drop is increasingly smaller. From a position perspective, the formation pressure drop is mainly concentrated near the wellbore; from a time perspective, the formation pressure drop is mainly concentrated in an initial period of production.

By regressing according to actual production data, a functional relationship between $G_p$ and t is obtained:

$$G_p=-2076(e^{-0.0000358t}-0.99)$$

t is introduced to obtain the cumulative gas production $G_{pt}$ at the time.

Figure 5:
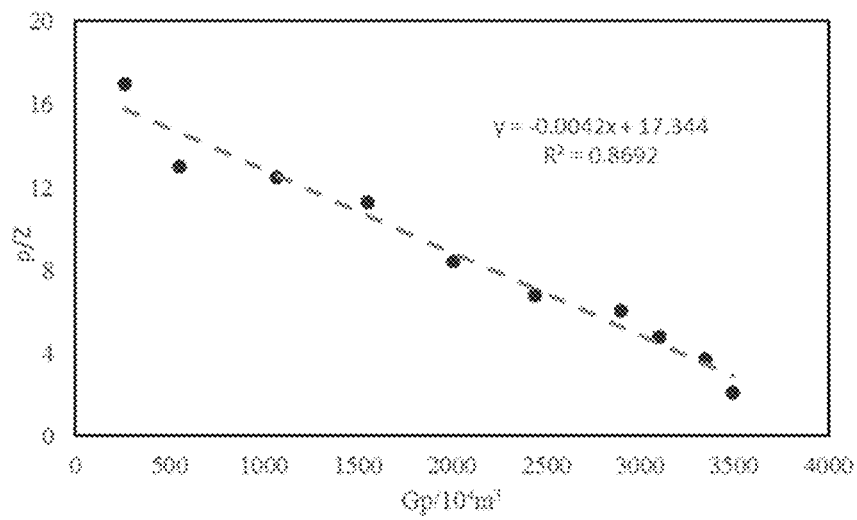
FIG. 5 is a relationship curve between $$\frac{\bar{p}_t}{Z_t}$$

As shown in FIG. 5, a time point is taken every 5,760 h (that is, 8 months), and an average formation pressure $\overline{p}_t$ at that time is calculated according to an area weighting method. A natural gas deviation factor $Z_t$ at the corresponding time is calculated according to formula (11). Then a relationship between $$\frac{\overline{p}_t}{Z_t}$$

and the cumulative production $G_{pt}$ at each t is obtained, as shown in FIG. 5.

A straight line regression of a scattered point in FIG. 5 obtains:

$$\frac{\overline{p}_t}{Z_t} = -0.0042G_{pt} + 17.344$$

Let $$\frac{\overline{p}_t}{Z_t} = 0,$$

then, at this time, $G_{pt}$=4130×10$^4$ m$^3$. Thus, after considering the startup pressure gradient and the stress sensitivity, the reserve controlled by Well D1-4 is 0.413×10$^8$ m$^3$.

In the low-permeability and tight gas reservoirs, due to the existence of the startup pressure gradient, gas well production requires a larger pressure difference, which will cause the formation pressure to drop faster. In addition, the permeability stress sensitivity will cause the permeability to decrease and worsen a physical property of the reservoir and gas flow. Therefore, the method of the present invention considers the effects of the startup pressure gradient and the permeability stress sensitivity. As shown in FIG. 6, the single-well controlled reserve calculated by this method is smaller than that calculated by a conventional method. The calculation results show that the startup pressure gradient and the permeability stress sensitivity cannot be ignored in the calculation of the single-well controlled reserve of the low-permeability and tight gas reservoirs. These calculation results prove the feasibility of this method.

The present invention is described in further detail blow by analyzing the factors affecting reserve calculation.

Embodiment 2

Factors Affecting Reserve Calculation

1. Startup Pressure Gradient

In order to study the effect of the startup pressure gradient on the calculation result of the single-well controlled reserve, Well D1-4 is taken as an example, where the maximum permeability damage rate $D_{k3}$=22.68%, and the startup pressure gradient c in formula (14) is 0, 0.005, 0.01, 0.02, 0.03, 0.05, 0.08, 0.1, 0.2 and 0.3 MPa/m. A relationship curve between $\overline{p}/Z$ and $G_p$ under each startup pressure gradient is shown in FIG. 7.

By extending each regression line to an abscissa axis, a single-well controlled dynamic reserve under each startup pressure gradient is obtained, as shown in Table 2 and FIG. 8.

TABLE 2

| Single-well controlled dynamic reserve under startup pressure gradient | | | | | | | | | | |
|---|---|---|---|---|---|---|---|---|---|---|
| Startup pressure gradient/ MPa · m$^{-1}$ | 0 | 0.005 | 0.01 | 0.02 | 0.03 | 0.05 | 0.08 | 0.1 | 0.2 | 0.3 |
| Single-well controlled reserve/10$^4$ m$^3$ | 4130 | 4128 | 4122 | 4118 | 4079 | 4023 | 3957 | 3941 | 3932 | 3930 |

As shown in FIG. 8, based on the above table, when c<0.02 MPa/m, the effect of the startup pressure gradient on the single-well controlled reserve is small. When the startup pressure gradient reaches 0.02 MPa/m, as the startup pressure gradient increases, the single-well controlled reserve decreases significantly. When the startup pressure gradient reaches 0.1 MPa/m, the effect of the startup pressure gradient on the single-well controlled reserve gradually decreases.

2. Stress Sensitivity

In order to study the effect of the stress sensitivity on the calculation result of the single-well controlled reserve, Well D1-4 is taken as an example, where the startup pressure gradient c=0.029, and the maximum permeability damage rate $D_{k3}$ in formula (14) is 0, 10%, 20%, 30% and 40%. A relationship curve between $\bar{p}/Z$ and $G_p$ under each maximum permeability damage rate is shown in FIG. 9.

By extending each regression line to an abscissa axis, a single-well controlled dynamic reserve under each maximum permeability damage rate is obtained, as shown in Table 3 and FIG. 10.

TABLE 3

Single-well controlled dynamic reserve under maximum permeability damage rate

| Maximum permeability damage rate $Dk_3$/% | 0 | 10 | 20 | 30 | 40 |
|---|---|---|---|---|---|
| Single-well controlled reserve/ $10^4$ m$^3$ | 4301 | 4157 | 4084 | 3853 | 3657 |

The calculated single-well controlled reserve has a negative correlation with the maximum permeability damage rate. The relationship curve is roughly a straight line, expressed as follows:

$$G_p = -15.92 D_{k3} + 4328$$

As can be seen from Table 3, FIG. 10 and the above formula, a higher stress sensitivity indicates a higher maximum permeability damage rate and a worse physical property of the reservoir. When the same cumulative gas production is reached, a pressure drop becomes larger and a single-well controlled dynamic reserve becomes lower. Therefore, the stress sensitivity hinders the development of the low-permeability and tight gas reservoirs.

Embodiment 3

Summary of Calculation of Single-Well Controlled Reserve in Block D1

A summary of reserves controlled by 52 wells in Block D1 is shown in Table 4. "-" indicates that the method has a large error or the data does not meet the calculation condition for a well.

TABLE 4

Summary of calculated reserves controlled by 52 wells in Block D1 (unit: $10^8$ m$^3$)

| Well No. | Material balance method | Fetkovich type curve method | Blasingame production decline method | Agarwal-Gardner production decline method | Flowing material balance method | Reserve calculation method considering low-permeability seepage characteristics | Average value |
|---|---|---|---|---|---|---|---|
| D1-1 | 0.515 | 0.682 | 0.570 | 0.655 | 0.692 | 0.492 | 0.601 |
| D1-10 | 0.665 | 0.782 | 0.763 | 0.735 | 0.802 | 0.620 | 0.728 |
| D1-105 | 0.465 | 0.654 | 0.517 | 0.601 | 0.613 | 0.421 | 0.545 |
| D1-106 | 0.644 | 0.782 | 0.675 | 0.732 | 0.765 | 0.596 | 0.699 |
| D1-117 | 0.355 | 0.326 | 0.413 | 0.493 | 0.524 | 0.350 | 0.410 |
| D1-125 | — | 0.269 | 0.244 | 0.241 | 0.254 | — | 0.245 |
| D1-129 | — | 0.579 | 0.488 | — | 0.564 | 0.423 | 0.513 |
| D1-143 | 0.189 | — | 0.205 | 0.247 | 0.265 | — | 0.227 |
| D1-147 | 0.166 | 0.241 | 0.231 | 0.266 | 0.297 | — | 0.240 |
| D1-151 | 0.440 | 0.466 | 0.444 | 0.465 | — | 0.376 | 0.438 |
| D1-152 | 0.464 | 0.564 | 0.550 | 0.598 | 0.621 | 0.431 | 0.538 |
| D1-36 | 0.398 | 0.518 | 0.420 | — | 0.431 | 0.366 | 0.427 |
| D1-4 | 0.465 | 0.505 | 0.479 | 0.532 | 0.499 | 0.413 | 0.482 |
| D1-5 | 0.505 | 0.487 | 0.588 | 0.610 | 0.641 | — | 0.550 |
| D1-8 | 0.494 | 0.564 | 0.512 | — | 0.634 | 0.456 | 0.532 |
| D1-85 | 0.885 | 1.133 | 0.986 | 1.025 | 1.154 | 0.858 | 1.007 |
| D1-86 | 1.231 | 1.498 | 1.331 | 1.031 | 1.112 | 1.027 | 1.205 |
| D1-89 | — | 0.825 | 0.711 | 0.672 | — | 0.609 | 0.704 |
| D1-92 | 0.378 | — | 0.401 | 0.502 | 0.489 | 0.366 | 0.427 |
| D4-1 | 0.477 | 0.501 | 0.497 | — | 0.469 | 0.402 | 0.469 |
| D4-106 | 0.587 | 0.741 | 0.640 | 0.699 | 0.711 | — | 0.676 |
| D4-107 | — | 0.654 | 0.533 | 0.576 | 0.612 | 0.492 | 0.573 |
| D4-108 | 0.856 | 0.997 | 0.943 | 1.109 | 1.101 | 0.829 | 0.972 |
| D4-109 | 0.404 | 0.452 | 0.392 | 0.487 | 0.429 | 0.358 | 0.420 |
| D4-11 | 0.612 | 0.642 | 0.601 | 0.715 | 0.684 | 0.539 | 0.632 |
| D4-110 | 0.298 | 0.378 | 0.366 | 0.413 | 0.421 | — | 0.375 |
| D4-111 | 0.247 | 0.311 | 0.256 | — | 0.321 | 0.235 | 0.274 |
| D4-112 | 0.484 | — | 0.492 | 0.477 | 0.532 | 0.411 | 0.479 |
| D4-113 | 0.313 | 0.454 | 0.356 | 0.365 | — | 0.308 | 0.359 |
| D4-114 | 0.199 | 0.264 | 0.258 | 0.297 | 0.267 | — | 0.257 |
| D4-12 | 0.285 | 0.299 | 0.301 | 0.311 | 0.306 | 0.249 | 0.292 |
| D4-15 | 1.111 | 0.996 | 1.124 | 1.097 | 1.137 | 0.905 | 1.062 |
| D4-17 | 0.683 | 0.821 | 0.753 | 0.839 | 0.846 | — | 0.788 |
| D4-18 | 0.350 | 0.411 | 0.390 | — | 0.403 | 0.322 | 0.375 |
| D4-19 | 1.098 | 1.112 | 1.158 | 1.057 | 1.214 | 0.934 | 1.095 |
| D4-2 | 0.512 | 0.664 | 0.521 | 0.498 | 0.605 | 0.464 | 0.544 |
| D4-20 | — | 1.183 | 1.112 | — | 1.283 | 0.987 | 1.141 |

TABLE 4-continued

Summary of calculated reserves controlled by 52 wells in Block D1 (unit: $10^8$ m$^3$)

| Well No. | Material balance method | Fetkovich type curve method | Blasingame production decline method | Agarwal-Gardner production decline method | Flowing material balance method | Reserve calculation method considering low-permeability seepage characteristics | Average value |
|---|---|---|---|---|---|---|---|
| D4-21 | 0.967 | 0.914 | 1.063 | 1.007 | 1.131 | 0.842 | 0.987 |
| D4-22 | 0.698 | 0.801 | 0.726 | 0.769 | 0.846 | — | 0.746 |
| D4-25 | 0.304 | 0.429 | 0.315 | 0.332 | 0.343 | 0.285 | 0.335 |
| D4-27 | 0.377 | 0.419 | 0.334 | 0.383 | 0.349 | — | 0.372 |
| D4-3 | 0.351 | 0.364 | 0.329 | 0.338 | 0.351 | 0.287 | 0.337 |
| D4-41 | 1.133 | 1.017 | 0.994 | — | 1.094 | 0.877 | 1.023 |
| D4-53 | — | 1.124 | 1.087 | 0.958 | — | 0.875 | 1.011 |
| D4-55 | 0.388 | 0.436 | 0.392 | 0.377 | 0.455 | 0.339 | 0.398 |
| D4-63 | 0.029 | 0.026 | 0.031 | 0.029 | 0.027 | 0.024 | 0.028 |
| DK25 | 0.976 | 0.796 | 0.742 | 0.782 | 0.647 | — | 0.789 |
| DK27 | 0.648 | 0.729 | 0.706 | 0.716 | 0.791 | 0.594 | 0.697 |
| DK33 | — | 0.263 | 0.229 | 0.262 | — | 0.208 | 0.241 |
| DP10 | 0.558 | — | 0.657 | 0.701 | 0.741 | 0.550 | 0.641 |
| DP6 | 0.997 | — | 1.090 | 1.069 | 1.125 | 0.886 | 1.033 |
| DP8 | 0.145 | — | 0.166 | 0.177 | 0.189 | 0.140 | 0.163 |

According to Table 2, the reserve controlled by each single well in Block D1 totals 30.083×10$^8$ m$^3$.

The reserves controlled by 52 wells in Block D1 are calculated by using dynamic methods. Among them, 45 wells are calculated using the material balance method, 46 wells are calculated using the Fetkovich type curve method, 52 wells are calculated using the Blasingame production decline method, 44 wells are calculated using the Agarwal-Gardner production decline method, 47 wells are calculated using the flowing material balance method, and 41 wells are calculated using the reserve calculation method considering low-permeability seepage characteristics.

The reserve calculation method considering low-permeability seepage characteristics considers the startup pressure gradient and the permeability stress sensitivity. Therefore, its calculation results are lower than other methods, which also modifies the single-well controlled reserves. The analysis of the factors affecting reserve calculation shows that, when the startup pressure gradient reaches 0.02 MPa/m, the calculated reserve is significantly reduced compared with the conventional methods, but when the startup pressure gradient is greater than 0.1 MPa/m, the effect gradually stabilizes. In addition, a higher reservoir stress sensitivity indicates a smaller calculated reserve. Therefore, the startup pressure gradient and the stress sensitivity cannot be ignored in the calculation of the single-well controlled reserve of the low-permeability and tight gas reservoirs.

The reserve of each well calculated by various methods is averaged, and the single-well controlled dynamic reserve in Block D1 totals 30.08×10$^8$ m$^3$. An original static reserve is 33.68×10$^8$ m$^3$, and a residual dynamic gas reserve is 8.40×10$^8$ m$^3$. The calculation and modification of single-well controlled reserve provides an important guidance for later reserve matching by a numerical simulation model. The residual gas reserves of various horizons finally determined through theoretical and simulation calculations are shown in Table 5 below.

TABLE 5

Quantitative analysis results of residual gas in the embodiments

| SN | Horizon No. | Static reserve/ ×10$^8$ m$^3$ | Dynamic reserve/ ×10$^8$ m$^3$ | Residual dynamic reserve/ ×10$^8$ m$^3$ | Recovery percent of dynamic reserve/% |
|---|---|---|---|---|---|
| 1 | H3 | 9.62 | 8.55 | 1.74 | 79.62 |
| 2 | H2 | 0.26 | 0.24 | 0.06 | 75.98 |
| 3 | H1 | 5.95 | 5.35 | 3.04 | 43.22 |
| 4 | S2 | 1.67 | 1.50 | 0.59 | 60.51 |
| 5 | S1 | 15.38 | 13.72 | 2.49 | 81.87 |
| 6 | T2 | 0.80 | 0.72 | 0.48 | 32.83 |
| Total | / | 33.68 | 30.08 | 8.40 | 72.07 |

The above-mentioned are merely preferred embodiments of the present invention, and are not intended to limit the present invention. Any modifications, equivalent replacements and improvements etc. within the spirit and principle of the present invention all should be included in the protection scope of the present invention.

What is claimed is:
1. A method for calculating a single-well controlled reserve of a low-permeability/tight gas reservoir and analyzing residual gas thereof, wherein the method comprises:
(1) establishing a new method for calculating the single-well controlled reserve of the low-permeability and tight gas reservoirs on the basis of a startup pressure gradient c, a stress sensitivity, and a slippage effect γ;
(2) obtaining parameters of a gas well to be tested and production interval, wherein the parameters comprise a wellbore radius $r_w$, an average viscosity of natural gas μ, an original formation pressure $p_i$, an original gas deviation factor $Z_i$, a formation temperature T, a surface temperature $T_{sc}$, a porosity of gas reservoir Ø, an original average permeability $K_O$, a maximum permeability damage rate $D_{k3}$, an average gas deviation factor Z, a surface pressure $p_{sc}$, a thickness of gas reservoir h, a natural gas density ρ, and a supply radius $r_e$; wherein the startup pressure gradient c and the slippage effect γ are determined based on the original average perme- ability $K_0$, and the stress sensitivity is characterized by the maximum permeability damage rate $D_{k3}$; and (3) determining a single-well controlled reserve of the gas well to be tested based on the obtained parameters by using the established new method for calculating the single-well controlled reserve of low permeability and tight gas reservoirs;

wherein the new method for calculating the single-well controlled reserve of the low-permeability and tight gas reservoirs is established on the basis of the startup pressure gradient c, the stress sensitivity and the slippage effect $\gamma$ by:

a pressure p at a certain point in a formation of the gas reservoir is expressed as a function of a position r and a time t as:

$$p = p(r,t) \quad (1)$$

a motion equation of unsteady gas seepage considering an effect of the startup pressure gradient is:

$$\frac{\partial p}{\partial r} - c = \frac{\mu v}{0.001K} + \alpha\rho(2.4 \times 10^5 v')^2 \quad (2)$$

wherein, a second term in the right of equal sign describes near-wellbore high-speed non-Darcy seepage; $v'$ is approximately expressed as:

$$v' = \frac{1}{2\pi hr} \cdot \frac{p_{sc}ZT}{T_{sc}p} q_{sc} \quad (3)$$

therefore, v in the formula is expressed as:

$$v = \frac{0.001K}{\mu}\left[\frac{\partial p}{\partial r} - c - \alpha\rho(2.4 \times 10^5 v')^2\right] \quad (4)$$

a continuity equation of gas seepage is:

$$\frac{\partial(\rho v)}{\partial r} = -\frac{\partial(\rho\varphi)}{\partial t} \quad (5)$$

a state equation of gas seepage is:

$$pV = ZnRT \quad (6)$$

wherein, an effect of the stress sensitivity is characterized by the maximum permeability damage rate D considering the slippage effect $\gamma$ and the stress sensitivity, a permeability is expressed as:

$$K = K_0(1 - D_{k3})\left(1 + \frac{\gamma}{p_i}\right) \quad (7)$$

according to field experience, a relationship between the block's startup pressure gradient and permeability is:

$$c = 0.0672 e^{-0.723K_0} \quad (8)$$

a relationship between a turbulence factor and the permeability is further obtained:

$$\alpha = \frac{1.15 \times 10^9}{K_0\Phi} \quad (9)$$

when a reservoir permeability is less than 0.1 mD, a relationship between the slippage effect and the permeability is:

$$\gamma = 0.86 K_0^{-0.33} \quad (10)$$

through a sampling test of a fluid from the analysis block, a relationship between a deviation factor Z and an average formation pressure $\bar{p}$ obtained:

$$Z = 0.000365\bar{p}^2 - 0.008726\bar{p} + 0.936954 \quad (11)$$

wherein, a regression coefficient $R^2=0.9979$, showing a good regression effect equations (1)-(4) are combined with equations (6)-(11), and a combination result is brought into the continuity equation (5) to obtain a differential equation of gas seepage in the low-permeability and tight gas reservoirs, which considers the slippage effect, the startup pressure gradient c and the permeability stress sensitivity:

$$\left(\frac{\partial p}{\partial r}\right)^2 - \frac{\partial p}{\partial r}\left[0.0672 e^{-0.723k_0} + \frac{16.56 \times 10^{18}\rho}{K_0\varphi} \cdot \frac{p_{sc}^2 Z^2 T^2 q_{sc}^2}{T_{sc}^2 p^2 h^2 \pi^2 r^2}\right] + \quad (12)$$

$$p\frac{\partial^2 p}{\partial r^2} = -\frac{\partial p}{\partial r} \cdot \frac{\varphi\mu}{0.001 K_0(1 - D_{k3})\left(1 + \frac{\gamma}{p_i}\right)}$$

wherein, $q_{sc}$ is a function of time t, and a specific function relationship is determined by regression and matching of actual production data:

$$q_{sc} = F(t) \quad (13)$$

the equation (13) is substituted into the equation (12) to obtain:

$$\left(\frac{\partial p}{\partial r}\right)^2 - \frac{\partial p}{\partial r}\left[0.0672 e^{-0.723k_0} + \frac{16.56 \times 10^{18}\rho}{K_0\varphi} \cdot \frac{p_{sc}^2 Z^2 T^2 F^2(t)}{T_{sc}^2 p^2 h^2 \pi^2 r^2}\right] + \quad (14)$$

$$p\frac{\partial^2 p}{\partial r^2} = -\frac{\partial p}{\partial t} \cdot \frac{\varphi\mu}{K_0(1 - D_{k3})\left(1 + \frac{\gamma}{p_i}\right)}$$

wherein an initial condition and boundary conditions are:
initial condition:

$$p(r,0) = p_i \quad (15)$$

internal boundary condition:

$$r\frac{\partial p}{\partial r}\bigg|_{r=r_w} = \frac{6.37 F(t)\mu ZT}{Khp} \quad (16)$$

external boundary condition:

$$\frac{\partial p}{\partial r}\bigg|_{r=r_e} = c \quad (17)$$

under the initial condition (15) and the boundary conditions (16) and (17), the partial differential equation (14)

is solved to obtain the relationship between the formation pressure p and the position r and the time t.

2. The method for calculating a single-well controlled reserve of a low-permeability/tight gas reservoir and analyzing residual gas thereof according to claim 1, wherein a time point t is selected at a certain time step, and an average formation pressure $\bar{p}$ at the time t is calculated by using an area weighting method, comprising:

(1) taking a point every other $$\frac{r_e}{10}$$

from a well center to a control radius, and taking a total of 10 points;

(2) calculating an area weight $S_i$ corresponding to an i-th point from the well center to the control radius:

$$S_i = \pi \left(\frac{ir_e}{10}\right)^2 - \pi \left[\frac{(i-1)r_e}{10}\right]^2 \quad i = 1, 2, 3 \ldots 10 \quad (18)$$

(3) calculating an area weighted average pressure:

$$\bar{p} = \sum_{r=r_w}^{r_e} \frac{p_i S_i}{s} \quad (19)$$

wherein, S is a total well-controlled area:

$$S = \pi r_e^2 \quad (20)$$

regressing according to the actual production data to obtain a functional relationship between $G_p$ and t, and then bringing t to the cumulative gas production $G_p$ at the time;

plotting a relationship diagram of $\bar{p}/Z$ and $G_p$ by using the material balance method, selecting production data of the well in a pseudo-steady state flow, that is, data approximated into a straight line by the relationship curve of $\bar{p}/Z$ and $G_p$ for linear regression, and extending a straight line segment to an abscissa axis, wherein an abscissa value of an intersection is the single-well controlled reserve.

3. An information data processing terminal for implementing the method for calculating a single-well controlled reserve of a low-permeability/tight gas reservoir and analyzing residual gas thereof according to claim 1.

4. The information data processing terminal of claim 3, wherein the information data processing terminal is further programmed to implement the method of claim 2.

\* \* \* \* \*